(12) United States Patent
Lam

(10) Patent No.: US 8,212,788 B2
(45) Date of Patent: Jul. 3, 2012

(54) TOUCH INPUT TO MODULATE CHANGEABLE PARAMETER

(75) Inventor: Wilson Lam, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 12/437,337

(22) Filed: May 7, 2009

(65) Prior Publication Data

US 2010/0283742 A1  Nov. 11, 2010

(51) Int. Cl.
 G06F 3/041 (2006.01)
 G06F 3/033 (2006.01)
(52) U.S. Cl. ........................................ 345/173; 715/863
(58) Field of Classification Search .................. 345/173; 715/863
 See application file for complete search history.

(56) References Cited

U.S. PATENT DOCUMENTS

| 7,358,985 | B2 | 4/2008 | Uchihashi et al. | |
| 2006/0164382 | A1 | 7/2006 | Kulas et al. | |
| 2008/0036771 | A1 | 2/2008 | Bae | |
| 2008/0204426 | A1 | 8/2008 | Hotelling et al. | |
| 2008/0211783 | A1* | 9/2008 | Hotelling et al. | 345/173 |

FOREIGN PATENT DOCUMENTS

WO 2006127466 A2 11/2006

OTHER PUBLICATIONS

Hix, et al., "Pre-Screen Projection: From Concept to Testing of a New Interaction Technique", Proceedings of the SIGCHI conference on Human factors in computing systems, Retrieved at <<http://www.cs.tufts.edu/~jacob/papers/chi95.pdf, May 7-11, 1995, pp. 1-9.
Baudisch, et al., "Collapse-to-Zoom: Viewing Web Pages on Small Screen Devices by Interactively Removing Irrelevant Content", Proceedings of the 17th annual ACM symposium on User interface software and technology, Retrieved at <<http://research.microsoft.com/pubs/69037/9.pdf>>, 20004, pp. 1-4.
New, et al., "Med-Life: A Diagnostic Aid for Medical Imagery", In Proceedings of the International Conference on Mathematics and Engineering Techniques in Medicine and Biological Sciences, Retrieved at <<http://www.cs.utk.edu/~new/publications/NewEtAl-METMBS04.pdf>>, Sep. 4, 2005, pp. 1-5.
Aaltonen, et al., "Interacting with Home and Home Appliances in a Hand-Held Terminal", OzCHI 2003 17th Annual Conference, Retrieved at <<http://www.nokia.com/library/files/docs/Interacting_with_Home_and_Home_appliances_in_a_Hand-Held_Terminal.pdf>>, Nov. 26-28, 2003, pp. 1-10.

* cited by examiner

Primary Examiner — Kevin M Nguyen
(74) Attorney, Agent, or Firm — Alleman Hall McCoy Russell & Tuttle LLP

(57) ABSTRACT

A computing system includes a touch-input receptor and a touch-detection module. The touch-detection module is configured to track a touch input directed to the touch-input receptor. The computing system also includes a control module to change a parameter of the computing system indicated by an initial portion of the touch input tracked by the touch-detection module. The control module is configured to change the parameter by an amount indicated by a subsequent portion of the touch input tracked by the touch-detection module.

20 Claims, 5 Drawing Sheets

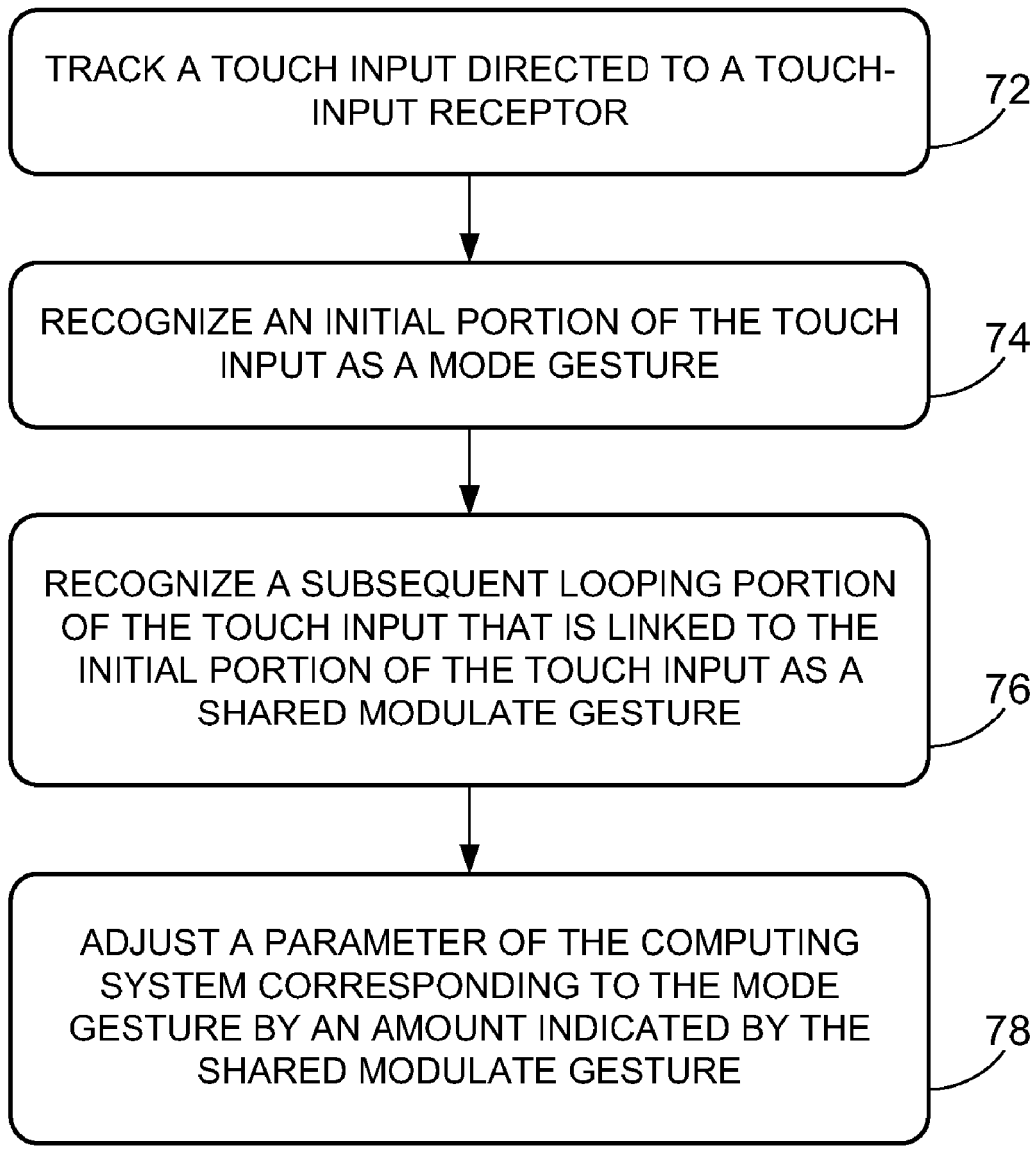

TOUCH INPUT TO MODULATE CHANGEABLE PARAMETER

BACKGROUND

A touch display is a display that serves the dual function of visually presenting information and receiving user input. Touch displays may be utilized with a variety of different devices to provide a user with an intuitive input mechanism that can be directly linked to information visually presented by the touch display. A user may use touch input to push soft buttons, turn soft dials, size objects, orientate objects, or perform a variety of different inputs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A touch input to modulate a changeable parameter of a computing system is disclosed. According to one aspect of the present disclosure, a computing system includes a touch-input receptor and a touch-detection module. The touch-detection module is configured to track a touch input directed to the touch-input receptor. The computing system also includes a control module to change a parameter of the computing system indicated by an initial portion of the touch input tracked by the touch-detection module. The control module is configured to change the parameter by an amount indicated by a subsequent portion of the touch input tracked by the touch-detection module.

BRIEF DESCRIPTION OF THE DRAWINGS

FIG. 6 shows a method of interpreting touch input in accordance with an embodiment of the present disclosure.

DETAILED DESCRIPTION

Figure 1:
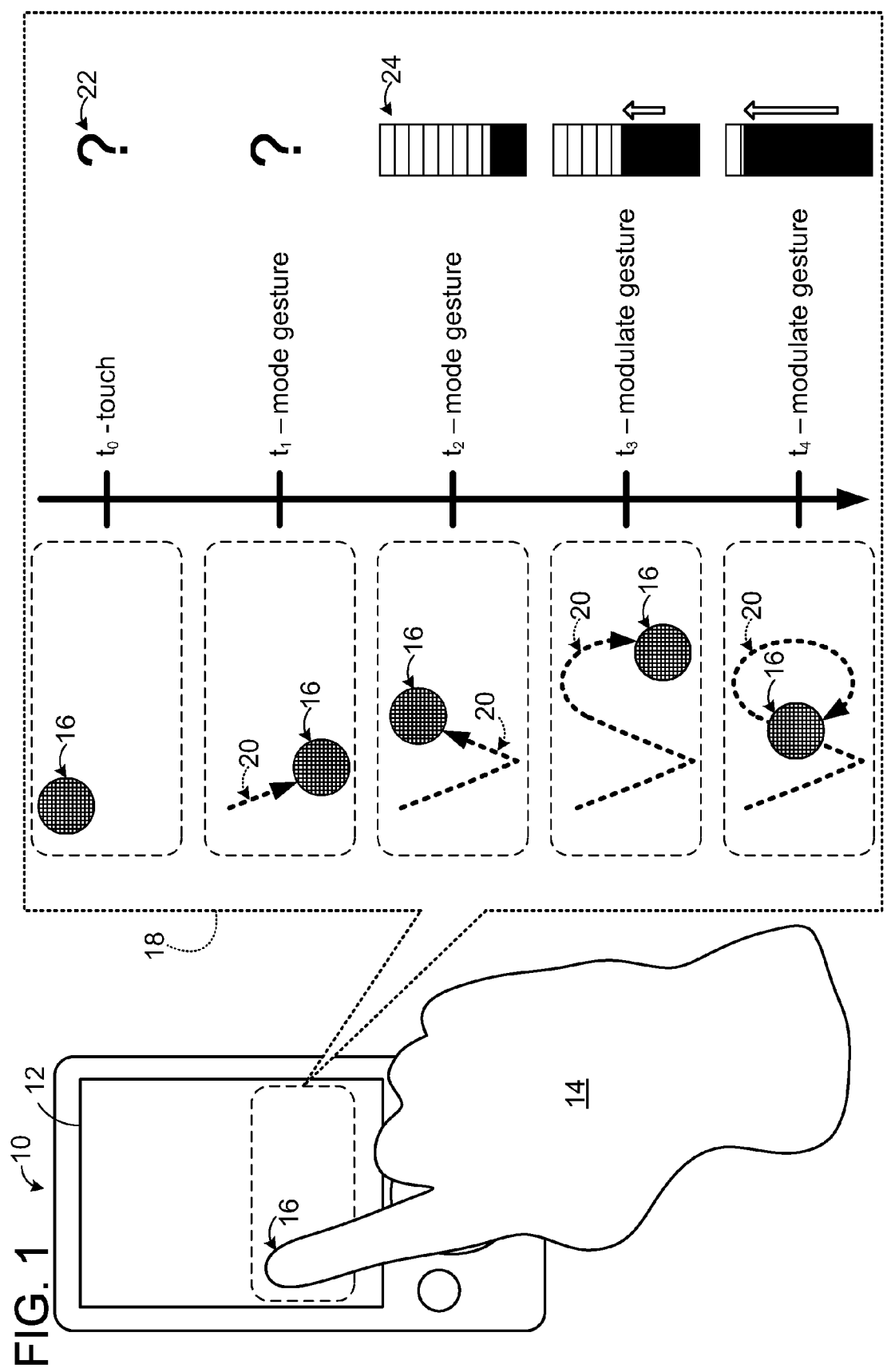
FIG. 1 shows a touch input directed to a touch display of a computing system in accordance with an embodiment of the present disclosure.

FIG. 1 shows a computing system 10 that includes a touch display 12. Touch display 12 may serve as both a display and an input mechanism. Touch inputs directed to the touch display can be interpreted as different gestures by the computing system. As such, a user can perform a variety of different touch inputs, and the gestures interpreted from these touch inputs can be used to control the operation of the computing system.

As described in more detail below, some touch inputs may be interpreted as a modulate gesture. Such a modulate gesture can be linked after another gesture so that a user can control the extent to which a parameter associated with the other gesture is changed. The initial gesture, linked in front of the modulate gesture, may be referred to as a mode gesture. A user may perform different mode gestures to initiate zoom operations, scroll operations, volume-change operations, or any number of other operations. Each of these mode gestures may be different from one another. A user may link the same modulate gesture to any of the mode gestures to modulate the effects of the mode gesture. In this way, the same modulate gesture can be used to modulate a zoom level, a scroll level, a volume level, or any number of other parameters associated with the various mode gestures.

As an example, FIG. 1 shows a user 14 directing touch input to touch display 12. In this example, a user is touching touch display 12 with a single finger. It is to be understood that touch input may be directed to a touch display via a variety of different mechanisms, including one or more user fingers and/or one or more touch-input tools (e.g., a stylus). User 14 is touching touch display 12 at touch location 16.

FIG. 1 schematically shows a touch sequence 18 at times to through $t_4$. In the touch sequence, touch location 16 is schematically shown as a hatched circle.

At time $t_0$, user 14 initiates a touch input. A path 20 of the touch input is schematically shown with a dashed line at times $t_1$ through $t_4$. The touch input begins with a source (e.g., user 14) engaging the touch display and continues until the source disengages the touch display. In other words, the touch input is a single touch input, as opposed to a plurality of different touch inputs characterized by the source engaging and disengaging the touch display, with substantial time gaps between disengagements and subsequent engagements.

While touch sequence 18 shows a single touch input, it shows the user performing two different, linked together, gestures during the touch input. At times $t_1$ through $t_2$, the user is performing a mode gesture. Such a mode gesture may be associated with a changeable parameter of the computing system. In the illustrated example, the user is performing a mode gesture characterized by a touch input having a V-shaped path. Such a V-shaped mode gesture may, for example, be associated with a volume level of the computing system. As such, a user may execute the V-shaped mode gesture to indicate that a volume level of the computing device is to be changed. It is to be understood that a variety of different mode gestures may be used to indicate that various different parameters of the computing system are to be changed. Nonlimiting examples of such changeable parameters include zoom levels, scroll levels, rotation levels, brightness levels, and contrast levels. Virtually any changeable parameter may be associated with a mode gesture without departing from the spirit of this disclosure.

At times $t_0$ and $t_1$, the computing system is analyzing the touch input to determine which gesture the user is performing, if any. As such, question mark 22 schematically shows that a mode gesture has not yet been identified. At time $t_2$, the computing system recognizes that the V-shaped touch input is associated with a V-shaped gesture corresponding to a volume level. FIG. 1 schematically represents the volume level with a level indicator 24. In some embodiments, the computing system may provide the user with visual, audible, haptic, and/or other feedback to indicate that a mode gesture is recognized.

At times $t_3$ and $t_4$, user 14 links a shared modulate gesture after the V-shaped mode gesture. A shared modulate gesture is linkable with a variety of different mode gestures. The shared modulate gesture is used to indicate an amount to change the changeable parameter associated with the mode gesture to which the shared modulate gesture is linked.

In the illustrated scenario, in which the shared modulate gesture is linked to a V-shaped gesture that indicates a volume level is to be changed, the shared modulate gesture is used to change the volume level. This is schematically represented by an increasing level indicator 24 at times $t_3$ and time $t_4$.

In the illustrated embodiment, the shared modulate gesture is characterized by a looping touch input. In other words, the portion of the touch input that corresponds to the shared modulate gesture follows a looping path. As used herein, a looping gesture may include one or more open loops, closed loops, inwardly and/or outwardly spiraling loops, circular loops, elliptical loops, irregular loops, or any combination thereof.

The computing system may change the changeable parameter associated with the selected mode gesture based on different aspects of the shared modulate gesture. For example, in the case of a looping shared modulate gesture, the direction of looping, the angular measurement of the loop, and/or the angular speed of the looping may influence the changing of the parameter.

In the illustrated scenario, at time $t_3$ the shared modulate gesture has traveled approximately one third of a complete loop. In other words, an angular measurement of the shared modulate gesture is approximately 120°. At time $t_4$, the shared modulate gesture has traveled approximately three fourths of a complete loop, and the angular measurement of the shared modulate gesture is approximately 270°. As can be seen by comparing level indicator 24 at times $t_3$ and $t_4$, the volume level changes by an amount that corresponds to the angular measurement of the looping modulate gesture. The amount that a changeable parameter is changed can be based off of the angular measurement of the looping modulate gesture according to a linear relationship (e.g., x or 2x), an exponential relationship (e.g., $x^2$), or virtually any other mathematical relationship. Furthermore, as described below, the amount the changeable parameter is changed can be based on other variables, such as angular velocity.

In the illustrated scenario, the volume level increases as the user continues to perform a looping gesture in a clockwise direction. In other embodiments, a clockwise gesture may be used to decrease a parameter of the computing system.

Figure 2:
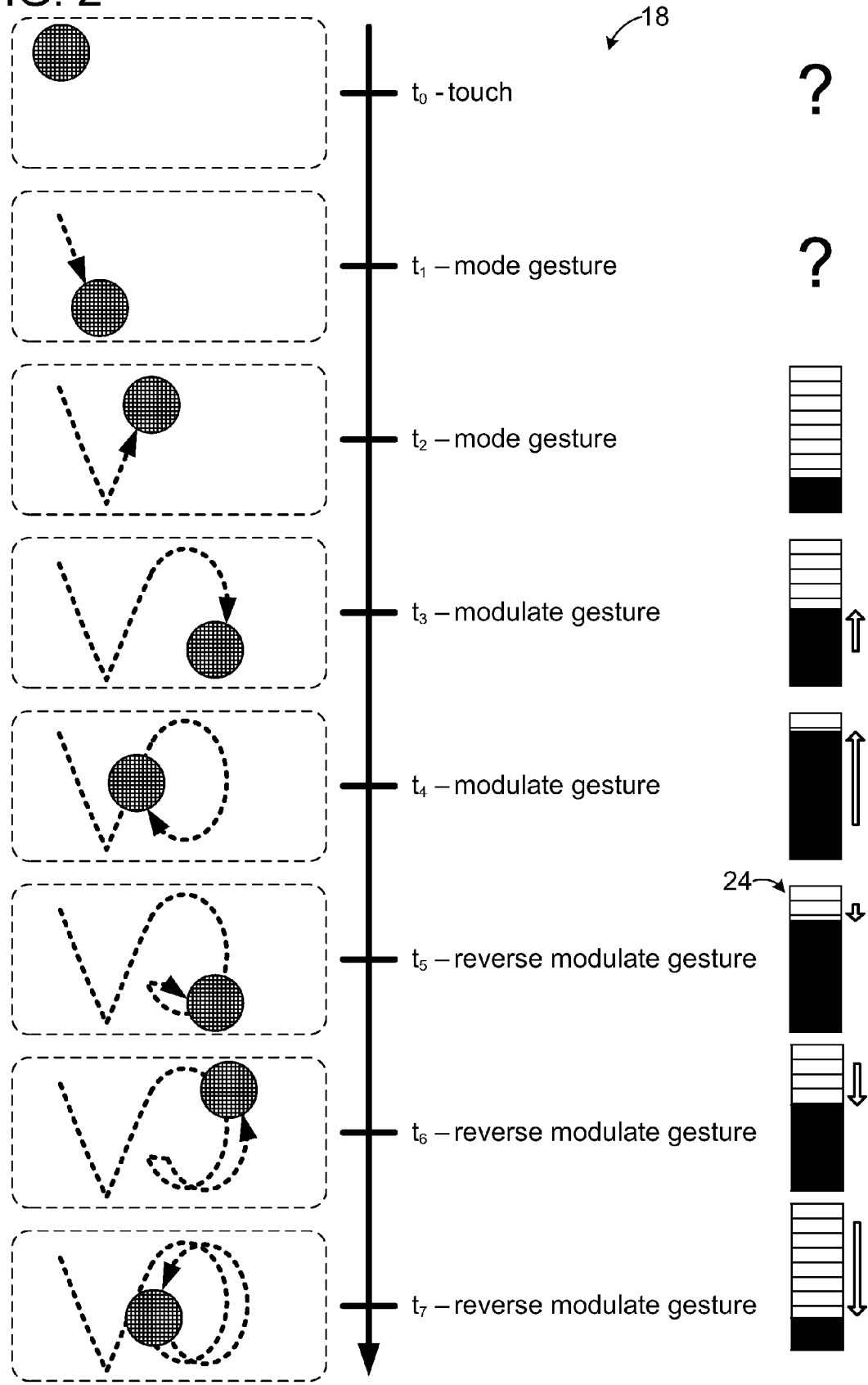
FIG. 2 shows a continuation of the touch input illustrated in FIG. 1.

FIG. 2 shows a continuation of touch sequence 18. At time $t_5$, user 14 reverses the direction of the shared modulate gesture so that at times $t_5$ through $t_7$, the looping gesture travels in a counterclockwise direction. As a consequence, at times $t_5$ through $t_7$, level indicator 24 schematically shows the volume level decreasing. In other embodiments, a counterclockwise gesture may be used to increase a parameter of the computing system.

As shown in FIG. 2, a single touch input may include one or more looping portions, which may change direction from clockwise looping to counterclockwise looping (or vice versa). In this way, a user can selectively increase and/or decrease a changeable parameter indicated by an initial portion of the touch input, which the user performs before the subsequent looping portions of the touch input.

Figure 3A:
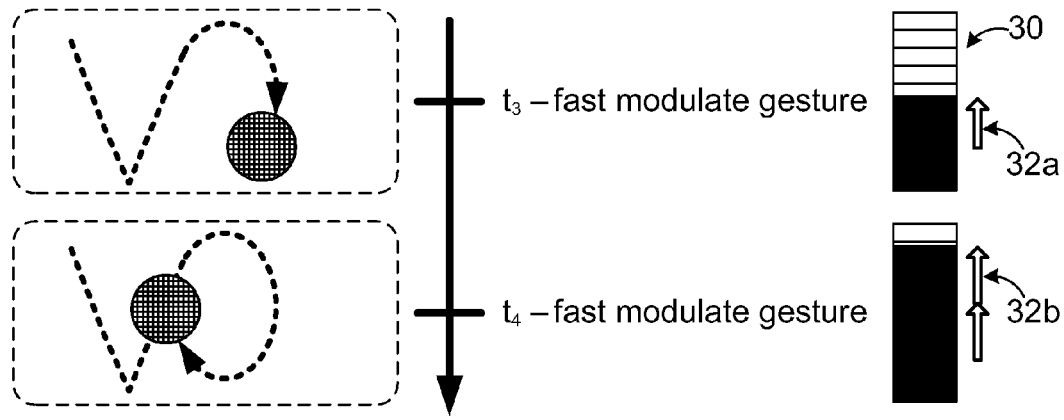
FIGS. 3A and 3B respectfully show a fast modulate gesture and a slow modulate gesture in accordance with an embodiment of the present disclosure.
Figure 3B:
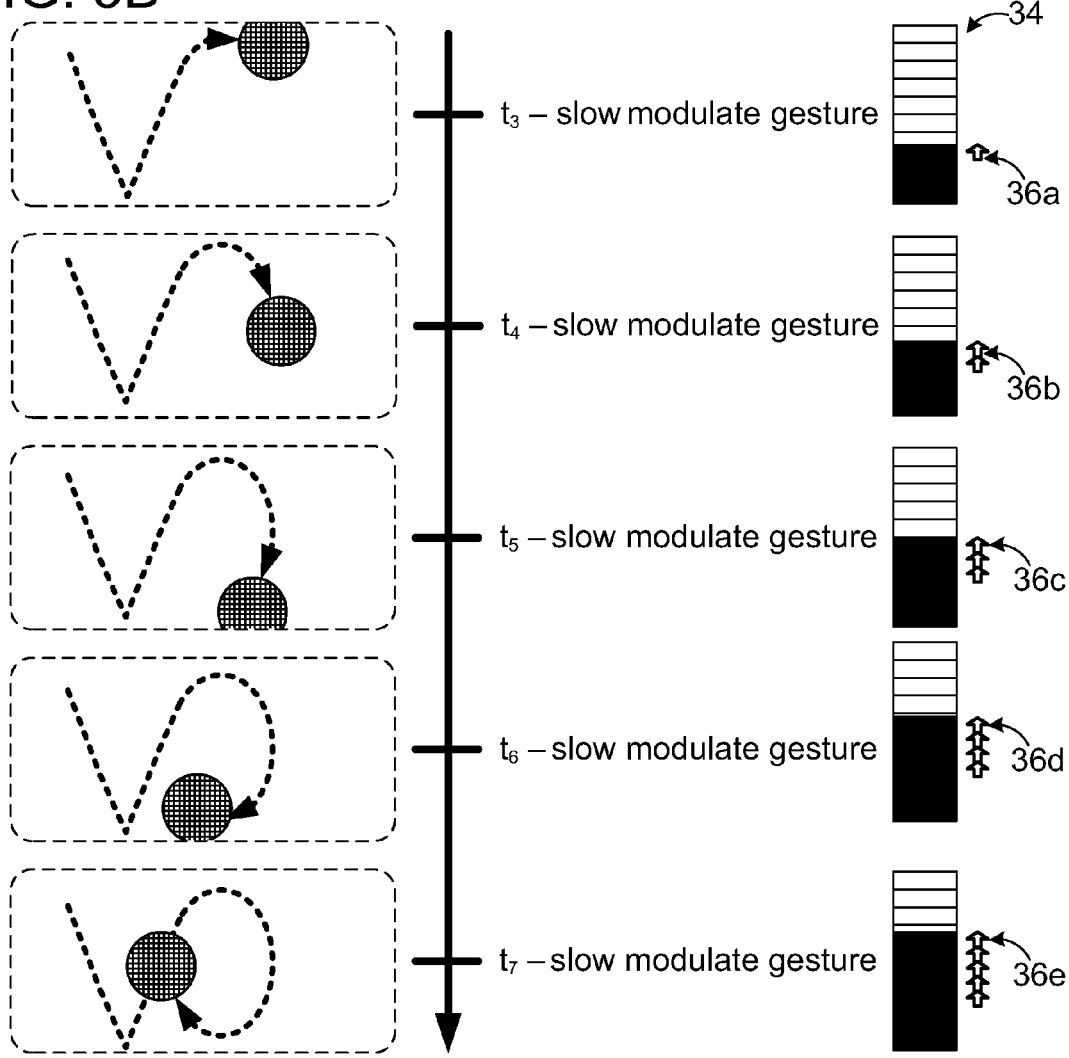

FIGS. 3A and 3B show how the computing system may change the changeable parameter associated with the selected mode gesture at a rate indicated by an angular speed of the shared modulate gesture, and/or in increments indicated by an angular speed of the shared modulate gesture. In particular, FIG. 3A shows a first example scenario in which the user performs a fast looping gesture, completing approximately three fourths of a complete loop in two time increments. Level indicator 30 schematically shows the rate at which the changeable parameter is changed in this scenario with increment arrows 32a and 32b, where each increment arrow corresponds to an amount the parameter changes during the corresponding time increment.

In contrast, FIG. 3B shows a second example scenario in which the user performs a slow looping gesture, completing approximately three fourths of a complete loop in five time increments. In other words, the scenario of FIG. 3B shows a user completing the same looping gesture as the scenario of FIG. 3A while taking 150% more time. Level indicator 34 schematically shows the rate at which the changeable parameter is changed in this scenario with increment arrows 36a-36e.

As can be seen, the slower gesture results in the changeable parameter changing at a slower rate and with finer increments. In particular, each of increment arrows 36a-36e are shorter than increment arrows 32a and 32b. As such, the parameter is shown changing in smaller increments with slower angular velocities. Furthermore, as can be seen by comparing level indicator 30 at time $t_4$ in FIG. 3A and level indicator 34 at time $t_7$ in FIG. 3B, the slower angular velocity results in a smaller overall change to the parameter. When angular velocity influences are implemented, a user may perform course adjustments with relatively fast gestures, while also performing fine adjustments with relatively slow gestures. A user may adjust gesture speed (i.e., angular velocity) during a gesture in order to make relatively larger changes to the changeable parameter and/or to make more precise changes to the changeable parameter.

Figure 4:
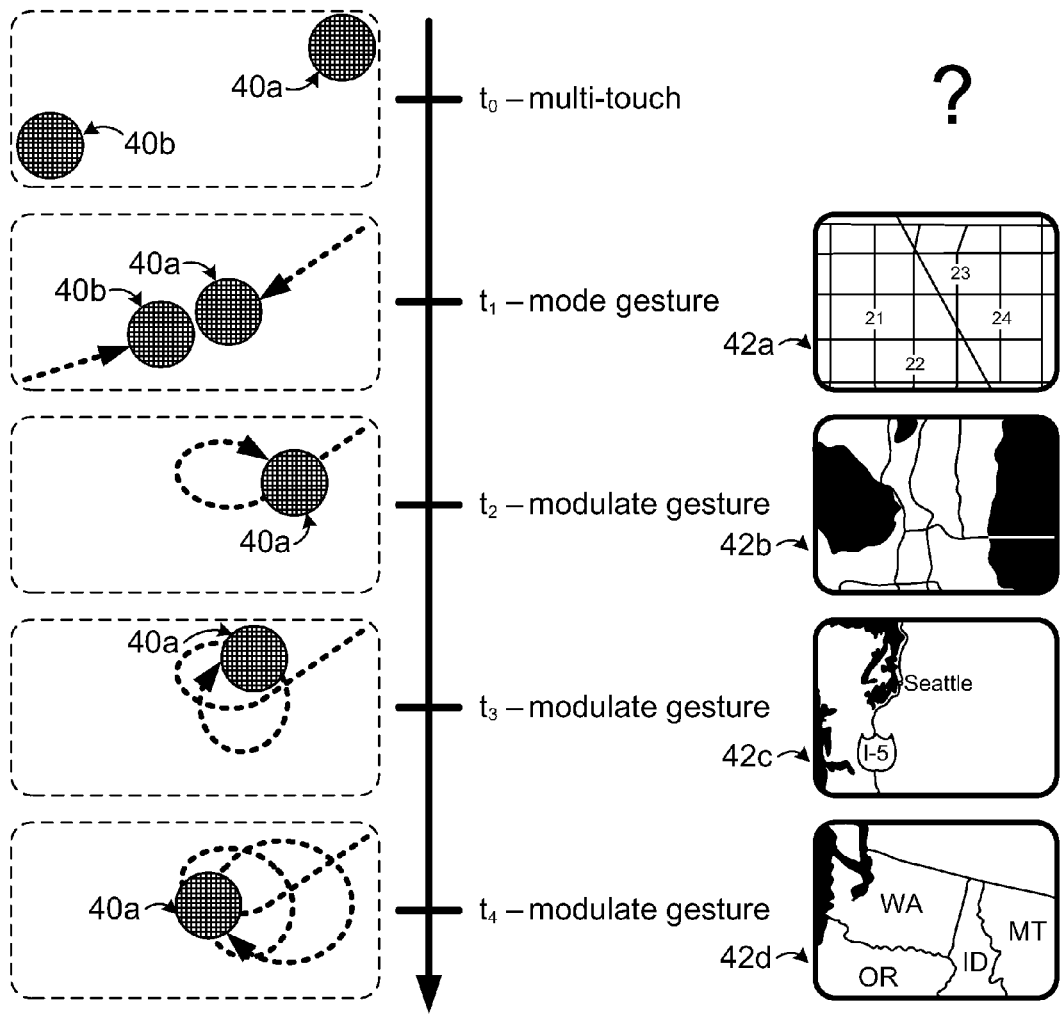
FIG. 4 shows a modulate gesture linked to a multi-touch mode gesture in accordance with an embodiment of the present disclosure.

FIG. 4 schematically shows a multi-touch mode gesture characterized by a touch input including a first touch location 40a and a second touch location 40b having overlapping durations. In other words, a user directs touch input to two or more different locations of a touch display at overlapping times. As shown at time $t_1$, a computing system may recognize such a multi-touch gesture as a multi-touch mode gesture. In the illustrated example, a multi-touch pinch gesture is shown. Such a pinch gesture may correspond to a zoom level, for example.

At time $t_2$, a looping modulate gesture is linked to the multi-touch mode gesture by continuing the touch input associated with touch location 40a. As schematically shown by maps 42a-42d, the modulate gesture may be used to change a zoom level of a display.

In some embodiments, a mode gesture may be as simple as tapping a graphic element displayed by a touch display. For example, a volume button may be displayed, and a user may tap the volume button as an initial portion of a touch input that indicates a volume level is to be changed. The user may then link a modulate gesture (e.g., looping gesture) to the initial tap to change the volume level.

In some embodiments, the herein described methods and processes for interpreting touch input may be tied to a computing system. The computing system of FIG. 1 is provided as a nonlimiting example. The gesturing described herein may be applied to a variety of different computing systems without departing from the scope of this disclosure. Such computing system will generally include a touch-input receptor for receiving touch inputs that may be interpreted as various different gestures. In some embodiments, such a touch-input receptor may be a touch display. In some embodiments, such a touch-input receptor may be a touch pad or other device capable of receiving touch inputs.

Figure 5:
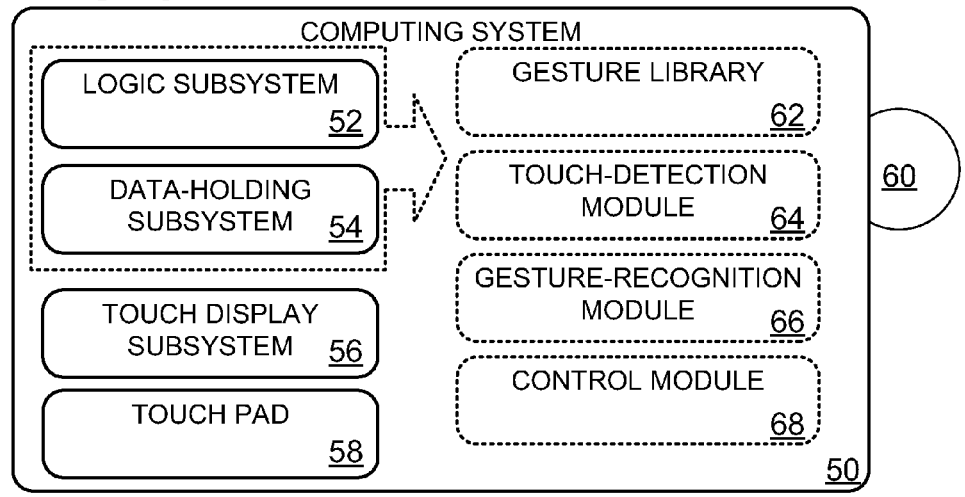
FIG. 5 schematically shows a computing system in accordance with an embodiment of the present disclosure.

As a more general example of a suitable computing device, FIG. 5 schematically shows a computing system 50 that may perform one or more of the herein described methods and processes. Computing system 50 includes a logic subsystem 52 and a data-holding subsystem 54. Computing system 50 may optionally include a touch display subsystem 56, a touch pad 58, and/or other components not shown in FIG. 5.

Logic subsystem 52 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 54 may include one or more physical devices configured to hold data and/or instructions executable by the logic subsystem to implement the herein described methods and processes. When such methods and processes are implemented, the state of data-holding subsystem 54 may be transformed (e.g., to hold different data). Data-holding subsystem 54 may include removable media and/or built-in devices. Data-holding subsystem 54 may include optical memory devices, semiconductor memory devices, and/or magnetic memory devices, among others. Data-holding subsystem 54 may include devices with one or more of the following characteristics: volatile, nonvolatile, dynamic, static, read/write, read-only, random access, sequential access, location addressable, file addressable, and content addressable. In some embodiments, logic subsystem 52 and data-holding subsystem 54 may be integrated into one or more common devices, such as an application specific integrated circuit or a system on a chip.

FIG. 5 also shows an aspect of the data-holding subsystem in the form of computer-readable removable media 60, which may be used to store and/or transfer data and/or instructions executable to implement the herein described methods and processes.

The terms "module" and/or "library" may be used to describe an aspect of computing system 50 that is implemented to perform one or more particular functions. In some cases, such a module and/or library may be instantiated, at least in part, via logic subsystem 52 executing or reading instructions or data held by data-holding subsystem 54. It is to be understood that different modules and libraries may be instantiated from the same application, code block, object, routine, function, and/or data structure. Likewise, the same module or library may be instantiated by different applications, code blocks, objects, routines, functions, and/or data structures in some cases.

In the illustrated embodiment, computing system 50 includes a gesture library 62, a touch-detection module 64, a gesture-recognition module 66, and a control module 68.

Gesture library 62 may include a shared modulate gesture and a plurality of different mode gestures. As described above, each mode gesture may be associated with a changeable parameter of the computing system (e.g., zoom level, volume level, scroll level, etc.). Such gestures may be single-touch gestures and/or multi-touch gestures. As described above, a shared modulate gesture is linkable with each mode gesture to indicate an amount to change a changeable parameter associated with that mode gesture. Such a shared modulate gesture may be a looping gesture characterized by a looping touch input.

Touch-detection module 64 may be configured to track a touch input directed to the touch display or touch pad. It is to be understood that virtually any touch detection technology may be used without departing from the scope of this disclosure.

Gesture-recognition module 66 may be configured to select a selected mode gesture from a plurality of different mode gestures based on an initial portion of a touch input. Furthermore, gesture-recognition module 66 may be configured to select the shared modulate gesture based on a subsequent portion of the touch input linked to the initial portion of the touch input. In some embodiments, these selections may include finding a best match in a gesture library. In some embodiments, the gesture-recognition engine may use one or more matching algorithms to select a mode gesture and/or a modulate gesture.

Control module 68 may be configured to change a changeable parameter associated with a selected mode gesture by an amount indicated by a shared modulate gesture. As described above, the control module may use one or more aspects of the modulate gesture to determine how to change the changeable parameter (e.g., angular measurement, angular speed, looping direction, etc.).

When included, touch display subsystem 56 may be used to present a visual representation of data held by data-holding subsystem 54. As the herein described methods and processes change the data held by the data-holding subsystem, and thus transform the state of the data-holding subsystem, the state of touch display subsystem 56 may likewise be transformed to visually represent changes in the underlying data. Furthermore, touch display subsystem 56 may be configured to recognize touch input using any suitable technology (e.g., capacitance detection, resistance detection, conductance detection, vision detection, etc.). Touch display subsystem 56 may include one or more touch display devices utilizing virtually any type of technology. Such touch display devices may be combined with logic subsystem 52 and/or data-holding subsystem 54 in a shared enclosure, or such display devices may be peripheral display devices.

When included, touch pad 58 may be configured to recognize touch input using any suitable technology (e.g., capacitance detection, resistance detection, conductance detection, vision detection, etc.). The touch pad translates the position of a source (e.g., finger, stylus, etc.) to a relative position on a display. A touch pad may be used in combination with a touch display or instead of a touch display.

FIG. 6 shows an example method 70 of interpreting touch input in a computing system. At 72, method 70 includes tracking a touch input directed to a touch-input receptor. At 74, method 70 includes recognizing an initial portion of the touch input as a mode gesture. At 76, method 70 includes recognizing a subsequent looping portion of the touch input that is linked to the initial portion of the touch input as a shared modulate gesture. At 78, method 70 includes adjusting a parameter of the computing system corresponding to the mode gesture by an amount indicated by the shared modulate gesture.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system, comprising:
   a touch display;
   a gesture library including a shared modulate gesture and a plurality of different mode gestures, each mode gesture associated with a changeable parameter of the computing system, and the shared modulate gesture linkable with each mode gesture to indicate an amount to change the changeable parameter associated with that mode gesture;
   a touch-detection module to track a touch input directed to the touch display, the touch input beginning with a source engaging the touch display and continuing until the source disengages the touch display;
   a gesture-recognition module to select a selected mode gesture from the plurality of different mode gestures based on an initial portion of the touch input and to select the shared modulate gesture based on a subsequent portion of the touch input linked to the initial portion of the touch input; and
   a control module to change the changeable parameter associated with the selected mode gesture by an amount indicated by the shared modulate gesture.

2. The computing system of claim 1, where the shared modulate gesture is characterized by a looping touch input.

3. The computing system of claim 2, where the control module is configured to change the changeable parameter associated with the selected mode gesture by an amount indicated by an angular measurement of the shared modulate gesture.

4. The computing system of claim 2, where the control module is configured to change the changeable parameter associated with the selected mode gesture at a rate indicated by an angular speed of the shared modulate gesture.

5. The computing system of claim 2, where the control module is configured to change the changeable parameter associated with the selected mode gesture in increments indicated by an angular speed of the shared modulate gesture.

6. The computing system of claim 2, where the control module is configured to increase the changeable parameter associated with the selected mode gesture responsive to the shared modulate gesture looping clockwise.

7. The computing system of claim 2, where the control module is configured to decrease the changeable parameter associated with the selected mode gesture responsive to the shared modulate gesture looping counterclockwise.

8. The computing system of claim 1, where one or more of the plurality of different mode gestures are multi-touch mode gestures.

9. The computing system of claim 1, where the changeable parameter associated with the selected mode gesture is a zoom level.

10. The computing system of claim 1, where the changeable parameter associated with the selected mode gesture is a volume level.

11. The computing system of claim 1, where the changeable parameter associated with the selected mode gesture is a scroll level.

12. A computing system, comprising:
    a touch-input receptor;
    a touch-detection module to track a touch input directed to the touch-input receptor; and
    a control module to change a parameter of the computing system indicated by an initial portion of the touch input by an amount indicated by a subsequent looping portion of the touch input.

13. A method of interpreting touch input in a computing system, the method comprising:
    tracking a touch input directed to a touch-input receptor, the touch input beginning with a source engaging the touch-input receptor and continuing until the source disengages the touch-input receptor;
    recognizing an initial portion of the touch input as a mode gesture, the mode gesture being one of a plurality of different mode gestures;
    recognizing a subsequent looping portion of the touch input that is linked to the initial portion of the touch input as a shared modulate gesture;
    adjusting a parameter of the computing system corresponding to the mode gesture by an amount indicated by the shared modulate gesture.

14. The method of claim 13, where adjusting the parameter of the computing system includes adjusting the parameter by an amount indicated by an angular measurement of the shared modulate gesture.

15. The method of claim 13, where adjusting the parameter of the computing system includes adjusting the parameter at a rate indicated by an angular speed of the shared modulate gesture.

16. The method of claim 13, where adjusting the parameter of the computing system includes adjusting the parameter in increments indicated by an angular speed of the shared modulate gesture.

17. The method of claim 13, where adjusting the parameter of the computing system includes increasing the parameter responsive to the shared modulate gesture looping clockwise.

18. The method of claim 13, where adjusting the parameter of the computing system includes decreasing the parameter responsive to the shared modulate gesture looping counterclockwise.

19. The method of claim 13, where the touch-input receptor is a touch display.

20. The method of claim 14, where the touch-input receptor is a touch pad.

* * * * *